US009335016B2

(12) United States Patent
Nakazato

(10) Patent No.: US 9,335,016 B2
(45) Date of Patent: May 10, 2016

(54) VEHICLE HEADLIGHT

(71) Applicant: Stanley Electric Co., Ltd., Tokyo (JP)

(72) Inventor: Yoshiaki Nakazato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 248 days.

(21) Appl. No.: 14/217,982

(22) Filed: Mar. 18, 2014

(65) Prior Publication Data

US 2014/0268846 A1 Sep. 18, 2014

(30) Foreign Application Priority Data

Mar. 18, 2013 (JP) ................................ 2013-054855

(51) Int. Cl.

| | |
|---|---|
| ***F21V 11/00*** | (2015.01) |
| ***F21S 8/10*** | (2006.01) |
| ***B60Q 1/00*** | (2006.01) |

(52) U.S. Cl.

CPC ........... *F21S 48/1145* (2013.01); *B60Q 1/0023* (2013.01); *F21S 48/1382* (2013.01); *B60Q 2300/146* (2013.01)

(58) Field of Classification Search

CPC .............. F21S 48/1145; F21S 48/1136; F21S 48/1352; F21S 48/1382; F21S 48/137; F21S 48/14; F21S 48/145; B60Q 1/0023; B60Q 2300/146

See application file for complete search history.

(56) References Cited

U.S. PATENT DOCUMENTS

2006/0109483 A1 5/2006 Marx et al.
2009/0015388 A1* 1/2009 Yagi .................... B60Q 1/0035 362/465
2011/0063115 A1 3/2011 Kishimoto

FOREIGN PATENT DOCUMENTS

DE 10 2007 025 330 A1 12/2008
EP 1 589 383 A1 10/2005

(Continued)

OTHER PUBLICATIONS

The partial European Search Report for the related European Patent Application No. 14020034.6 dated Nov. 5, 2014.

*Primary Examiner* — Y M Lee
(74) *Attorney, Agent, or Firm* — Kenealy Vaidya LLP

(57) ABSTRACT

A vehicle headlight can be configured such that the size of the vehicle headlight which includes a semiconductor laser element employed as a light source is reduced. The vehicle headlight can includes: a projection lens disposed on an optical axis extending in a front-to-rear direction of a vehicle body; a light-emitting device including a semiconductor laser element configured to emit a laser beam and a light-transmitting member configured to absorb and convert the wavelength of at least part of the laser beam from the semiconductor laser element; and a first reflection surface configured to reflect the light from the light-emitting device so as to transmit and project forward the resulting light through the projection lens. The vehicle headlight can further include: a light detection unit configured to detect a light beam of a specific color, the light detection unit being disposed between the projection lens and the light-emitting device and below the optical axis; a second reflection surface configured to reflect the light beam from the light-emitting device toward the light detection unit, the second reflection surface being disposed ahead of the front end of the first reflection surface; and a control unit configured to control the semiconductor laser element in accordance with a detection result provided by the light detection unit so that the semiconductor laser element does not emit the laser beam.

25 Claims, 11 Drawing Sheets

(56) References Cited

FOREIGN PATENT DOCUMENTS

| | | | |
|---|---|---|---|
| EP | 2 461 092 | A2 | 6/2012 |
| GB | 2 020 416 | A | 11/1979 |
| JP | 5122542 | B2 | 1/2013 |
| WO | 2012124607 | A1 | 9/2012 |

* cited by examiner (a)

(b)

(c)

(a)

(b)

VEHICLE HEADLIGHT

This application claims the priority benefit under 35 U.S.C. §119 of Japanese Patent Application No. 2013-054855 filed on Mar. 18, 2013, which is hereby incorporated in its entirety by reference.

TECHNICAL FIELD

The presently disclosed subject matter relates to vehicle headlights, and more particularly, to a vehicle headlight which employs a semiconductor laser element as a light source.

BACKGROUND ART

Conventionally, in the field of vehicle lighting unit, vehicle headlights have been suggested which include a semiconductor laser element employed as a light source (for example, see Japanese Patent No. 5122542 or its corresponding U.S. Patent Application Laid-Open Publication No. 2011-063115A1, hereinafter referred to as Patent Literature 1).

FIG. 1 is a longitudinal sectional view illustrating a vehicle headlight 200 disclosed in Patent Literature 1.

As illustrated in FIG. 1, the vehicle headlight 200 disclosed in Patent Literature 1 can include: a semiconductor laser element 210 serving as a laser light source; a phosphor 220 to be irradiated with a laser beam lased by the semiconductor laser element 210; a reflector 230; a retainer member 240 for retaining the phosphor 220; and a light detector 250 (which is made up of an optical filter 252 serving to shield light at a predetermined wavelength and a light-receiving element 254). The optical filter 252 to be used can shield light having a converted wavelength (visible light) and transmit laser light.

The vehicle headlight 200 constructed as mentioned above can be configured such that the phosphor 220 is determined to have become chipped due to some cause when the intensity of light detected on the light-receiving element 254 (the value of a current flowing through the light-receiving element 254) is equal to or greater than a predetermined value (threshold value), and then the operation of the semiconductor laser element 210 is stopped.

However, the vehicle headlight 200 constructed as mentioned above has the problem of an increase in size because the light detector 250 is disposed outside the front end of the reflector 230 and on a line L1 extending through the phosphor 220 from a line connecting between the semiconductor laser element 210 and the phosphor 220.

SUMMARY

The presently disclosed subject matter was devised in view of these and other problems and features in association with the conventional art. According to an aspect of the presently disclosed subject matter, a vehicle headlight can be configured such that the size of the vehicle headlight which includes a semiconductor laser element employed as a light source is reduced.

According to another aspect of the presently disclosed subject matter, a vehicle headlight can includes: a projection lens disposed on an optical axis extending in a front-to-rear direction of a vehicle body; a light-emitting device including a semiconductor laser element configured to emit a laser beam and a light-transmitting member configured to absorb and convert the wavelength of at least part of the laser beam from the semiconductor laser element; and a first reflection surface configured to reflect the light from the light-emitting device so as to transmit and project forward the resulting light through the projection lens. The vehicle headlight can further include: a light detection unit configured to detect a light beam of a specific color, the light detection unit being disposed between the projection lens and the light-emitting device and below the optical axis; a second reflection surface configured to reflect the light beam from the light-emitting device toward the light detection unit, the second reflection surface being disposed ahead of the front end of the first reflection surface; and a control unit configured to control the semiconductor laser element in accordance with a detection result provided by the light detection unit so that the semiconductor laser element does not emit the laser beam.

The vehicle headlight according to the above-mentioned aspect provides the following advantages.

First, the vehicle headlight employing the semiconductor laser element as a light source can be reduced in size as compared with the conventional vehicle headlight (see FIG. 1). This is because the light detection unit can be disposed between the projection lens and the light-emitting device, and the second reflection surface configured to reflect the light from the light-emitting device toward the light detection unit can be disposed ahead of the front end of the first reflection surface.

Secondly, it is possible to enhance the light utilization efficiency of the light-emitting device. This is because the light emitted from the light-emitting device forward and diagonally upward (the light that cannot be used as a basic light distribution pattern) can be allowed to be reflected by the second reflection surface so as to be incident upon the light detection unit.

In the vehicle headlight with the above configuration, the light of a specific color can be a light beam that is wavelength-converted by the light-transmitting member, and the control unit can control the semiconductor laser element so as not to emit a laser beam while the semiconductor laser element is emitting the laser beam and when the light detection unit does not detect light that has been wavelength-converted by the light-transmitting member.

In accordance with the above configuration, when the light-transmitting member has dropped off (or has become chipped), it is possible to prevent a laser beam emitted by the light-emitting device with the light-transmitting member having dropped off (or having become chipped) from being reflected on the first reflection surface and transmitted through a projection lens so as to be projected forward. This is because the control unit can control the semiconductor laser element so as not to emit a laser beam while the semiconductor laser element is emitting the laser beam and when the light detection unit does not detect light that has been wavelength-converted by the light-transmitting member (i.e., when the light-transmitting member has dropped off (or has become chipped) or when the light detection unit has failed).

In the vehicle headlight with any of the above configurations, a light shielding member can be disposed between the projection lens and the light-emitting device, the light shielding member being configured to block a light beam travelling upward among those beams from the light-emitting device to be projected forward through the projection lens.

In accordance with the above configuration, it is possible to form a light distribution pattern suitable for a low-beam light distribution pattern that includes a cut-off line defined by the light shielding member.

In the vehicle headlight with any of the above configurations, a light shielding member can be disposed between the second reflection surface and the light detection unit, and a pin hole through which a reflected light beam from the second reflection surface passes can be formed in the light shielding member.

In accordance with the above configuration, it is possible to improve the S/N ratio of the light detection unit. This is because the light shielding member that can include the pin hole through which a reflected beam of light from the second reflection surface passes can be disposed between the second reflection surface and the light detection unit, thereby making it possible to prevent light beams other than the light beams emitted by the light-emitting device and reflected on the second sub-reflection surface (for example, sunlight or ambient light such as light from oncoming vehicles) from passing through the pin hole and being incident upon the light detection unit.

In the vehicle headlight with any of the above configurations, the second reflection surface can be an ellipsoid of revolution having a first focus at or substantially near the light-transmitting member, and a second focus set inside the pin hole or at the vicinity thereof.

In accordance with the above configuration, it is possible to "further" improve the S/N ratio of the light detection unit. This is because the second reflection surface employed can be an ellipsoid of revolution having the first focus at or substantially near the light-transmitting member of the light-emitting device, and the second focus set inside the pin hole (or at the vicinity thereof). Since this allows the light from the light-emitting device reflected on the second reflection surface to be condensed on the second focus, the diameter of the pin hole can be reduced. As a result, it is possible to "further" prevent light beams other than the light emitted by the light-emitting device and reflected on the second reflection surface (for example, sunlight or ambient light such as light from oncoming vehicles) from passing through the pin hole and being incident upon the light detection unit.

In the vehicle headlight with any of the above configurations, an area of the first reflection surface to be irradiated with a laser beam from the light-emitting device with the light-transmitting member having dropped off can have a through hole formed to allow the laser beam to pass therethrough.

In accordance with the above configuration, even if it takes time until the semiconductor laser element is controlled so as not to emit laser beams, it is possible to prevent the laser beam emitted from the light-emitting device with the light-transmitting member having dropped off (or having become chipped) from being reflected on the main reflection surface and transmitted through the projection lens so as to be projected forward. This is because when the light-transmitting member has dropped off (or has become chipped), the laser beam emitted from the light-emitting device with the light-transmitting member having dropped off (or having become chipped) passes through the through hole formed in the main reflection surface.

In the vehicle headlight with any of the above configurations, an optical system configured to condense the laser beam from the semiconductor laser element so as to locally irradiate the light-transmitting member may further be included.

In accordance with the above configuration, it is possible to achieve a light-emitting device that provides high brightness.

In the vehicle headlight with any of the above configurations, the light-transmitting member can include: a diffusion layer having a first surface to be locally irradiated with a laser beam from the semiconductor laser element and a second surface opposite thereto, the diffusion layer configured to diffuse a laser beam irradiating locally the first surface so as to emit the beam as diffused light through the second surface; and a wavelength conversion layer having a third surface bonded to the second surface and a fourth surface opposite thereto, the wavelength conversion layer configured to convert the wavelength of at least part of the diffused laser beam incident upon the third surface from the diffusion layer so as to emit the resulting beam through the fourth surface.

In accordance with the above configuration, it is possible to prevent degradation in efficiency caused by a brightness saturation or temperature quenching effect. This is because the light from the semiconductor laser element condensed by an optical system (for example, the condenser lens) is not incident upon the wavelength conversion layer as local light, but diffused in the diffusion layer so as to be incident upon the wavelength conversion layer as diffused light having a generally uniform brightness distribution.

Note that the brightness saturation refers to the phenomenon in which when the energy density of light (for example, a laser beam from a semiconductor laser light source) is above a certain value, the fluorescent intensity does not increase with increasing energy density of the light (for example, the laser beam from the semiconductor laser light source). Further, the temperature quenching effect refers to the phenomenon in which as in the case of a semiconductor laser light source that is excited at high energy density, the heat generated by light (for example, a laser beam from the semiconductor laser light source) causes degradation in the efficiency of the phosphor itself.

In the vehicle headlight with the above configuration, the diffusion layer can be set at a thickness at which the diffused light emitted through the second surface has a generally uniform brightness distribution.

In accordance with the above configuration, it is possible to improve variations in brightness. This is because the light from the semiconductor laser element condensed by an optical system (for example, the condenser lens) is not incident upon the wavelength conversion layer as local light, but is diffused in the diffusion layer so as to be incident upon the wavelength conversion layer as diffused light having a generally uniform brightness distribution.

Note that the optical system for condensing light from the semiconductor laser element to irradiate the light-transmitting member locally (at a spot) may include a condenser lens which condenses light from the semiconductor laser element so as to locally irradiate the light-transmitting member. Or alternatively, the optical system may also include a condenser lens for condensing light from the semiconductor laser element and a light guide fiber for guiding light from the semiconductor laser element condensed by the condenser lens so as to locally irradiate the light-transmitting member.

In accordance with any of the above configurations, it is possible to reduce the size of the vehicle headlight which employs a semiconductor laser element as a light source.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle headlights of the presently disclosed subject matter with reference to the accompanying drawings in accordance with exemplary embodiments.

Now, with reference to the drawings, a description will be made to a lighting unit 100 for a vehicle headlight according to an exemplary embodiment of the presently disclosed subject matter (hereafter simply referred to as the lighting unit 100).

Figure 2:
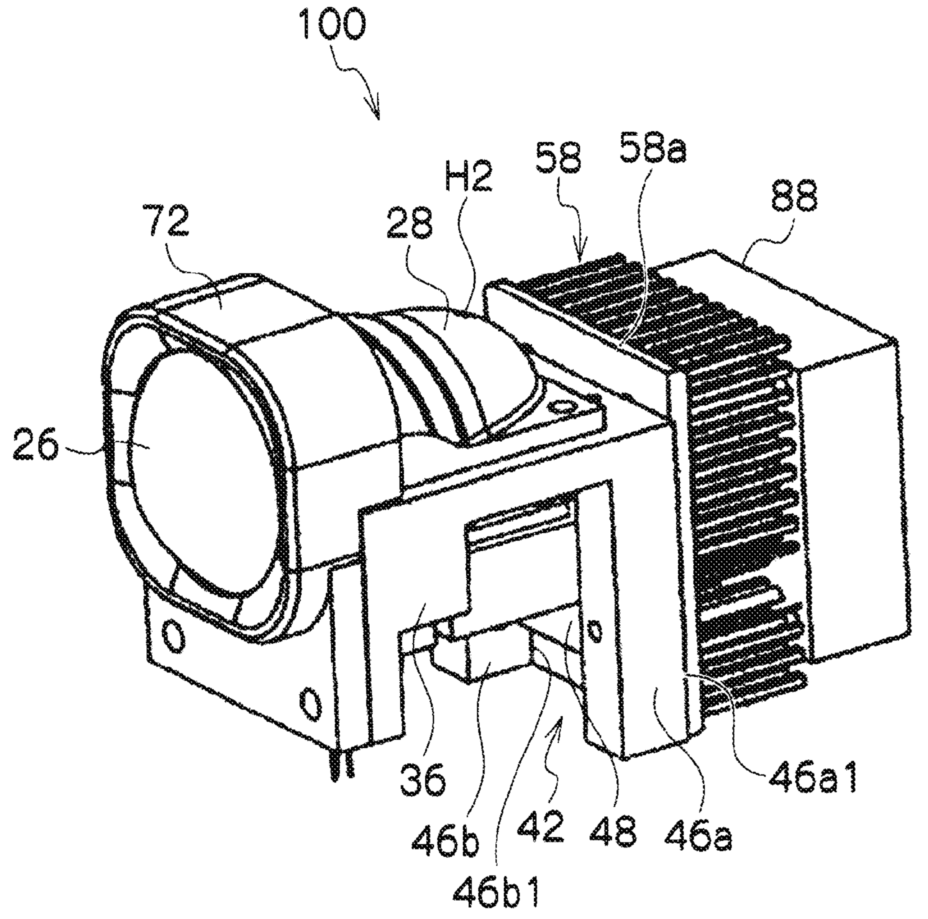
FIG. 2 is a perspective view illustrating a lighting unit 100 made in accordance with principles of the presently disclosed subject matter.
Figure 3:
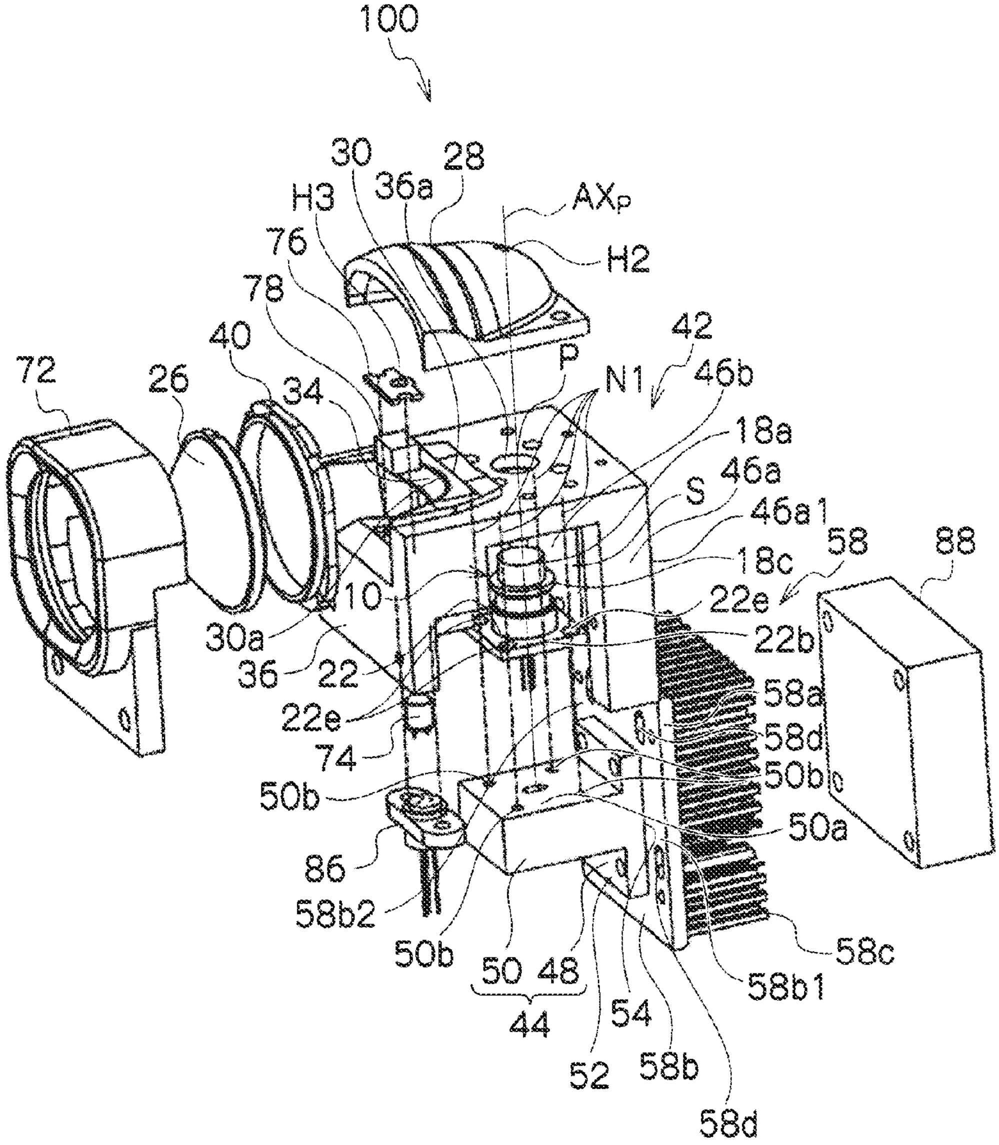
FIG. 3 is an exploded perspective view illustrating the lighting unit 100.
Figure 4:
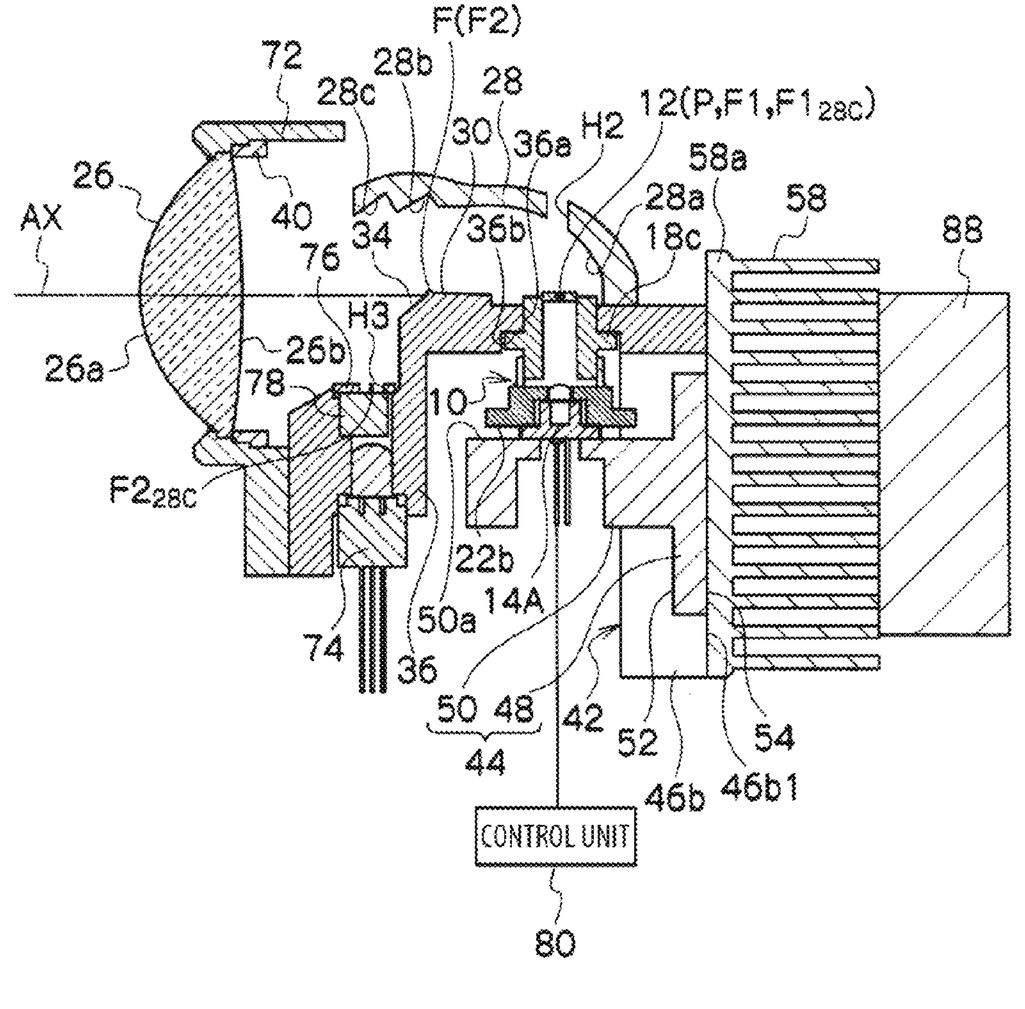
FIG. 4 is a sectional view illustrating the lighting unit 100 cut by a vertical plane including the optical axis thereof.

FIG. 2 is a perspective view illustrating the lighting unit 100; FIG. 3 is an exploded perspective view; and FIG. 4 is a sectional view illustrating the lighting unit 100 cut by a vertical plane including the optical axis thereof.

The lighting unit 100 is a projector type lighting unit that is configured to form a low-beam light distribution pattern. As illustrated in FIGS. 2 to 4, the lighting unit 100 can include: a light-emitting device 10; a projection lens 26 disposed on an optical axis AX extending in the front-to-rear direction of the vehicle; a reflector 28 including a main reflection surface 28*a*, a first sub-reflection surface 28*b*, and a second sub-reflection surface 28*c*; a light detection unit 74; a retainer member 36 configured to retain these components; and a control unit 80 configured to control the light-emitting device 10 (a semiconductor laser element 14).

Figure 5:
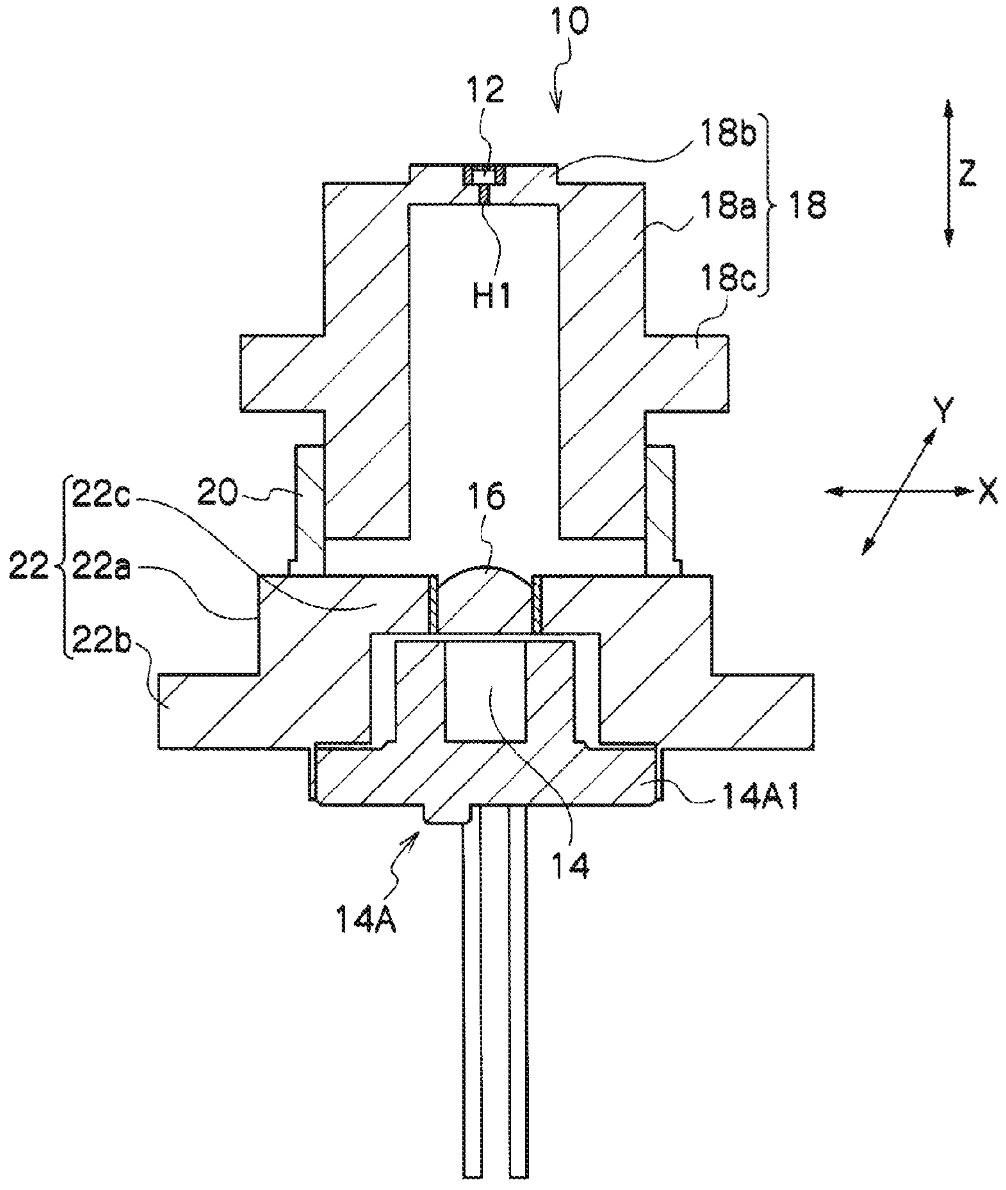
FIG. 5 is a longitudinal sectional view illustrating a light-emitting device 10.

FIG. 5 is a longitudinal sectional view illustrating the light-emitting device 10.

As illustrated in FIG. 5, the light-emitting device 10 can include: a light-transmitting member 12 configured to absorb at least part of a laser beam from the semiconductor laser element 14 and wavelength-converting the same; the semiconductor laser element 14; a condenser lens 16; and a holder (a first holder 18, a second holder 20, and a third holder 22) configured to retain these components.

To allow a laser beam, which is emitted from the semiconductor laser element 14 and condensed by the condenser lens 16, to radiate the light-transmitting member 12 highly accurately without being dislocated in the X and Y directions (the Y direction is orthogonal to the paper plane of FIG. 5) and the Z direction, the light-emitting device 10 can be configured to include, in the combination of the first holder 18 configured to retain the light-transmitting member 12, the third holder 22 configured to retain the semiconductor laser element 14 and the condenser lens 16, and the second holder 20 configured to couple the first holder 18 and the third holder 22 to each other.

The first holder 18 can be made of a metal such as stainless steel and as illustrated in FIG. 5, can include a cylinder-shaped tubular section 18*a*, a circular base section 18*b* for blocking the upper opening end thereof, and a flange section 18*c* provided on the outer circumference of the tubular section 18*a*.

Figure 6:
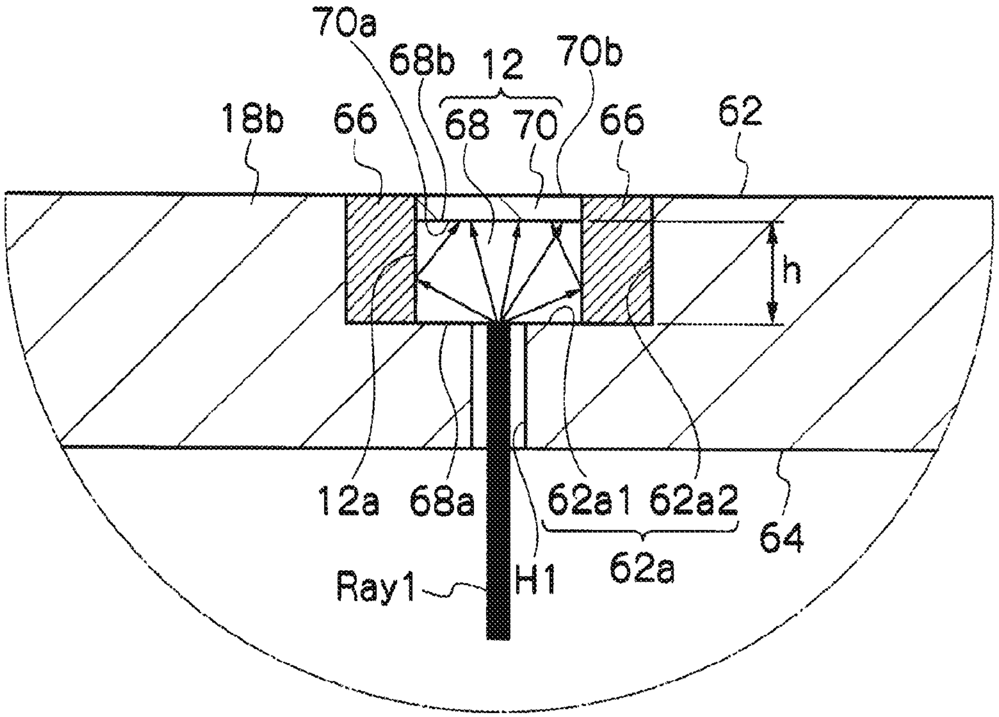
FIG. 6 is an enlarged partly sectional view illustrating the vicinity of a base section 18*b;*

FIG. 6 is an enlarged partly sectional view illustrating the vicinity of the base section 18*b*.

As illustrated in FIG. 6, the base section 18*b* can include: a front surface 62 having a recessed portion 62*a*; a rear surface 64 opposite thereto; and a through hole H1 that penetrates through the front surface 62 (a bottom surface 62*a*1 of the recessed portion 62*a*) and the rear surface 64.

In the recessed portion 62*a*, the light-transmitting member 12 and a reflective member 66 can be disposed.

The light-transmitting member 12 can be a wavelength conversion member configured to include a diffusion layer 68 (also referred to as a diffusion plate) and a wavelength conversion layer 70. Note that the diffusion layer 68 may be eliminated so that the entire light-transmitting member 12 may be made up of the wavelength conversion layer 70.

While covering the through hole H1, the diffusion layer 68 can include a lower surface 68*a* (equivalent to a first surface in the presently disclosed subject matter) secured to the front surface 62 (the bottom surface 62*a*1 of the recessed portion 62*a*) and an upper surface 68*b* opposite thereto (equivalent to a second surface in the presently disclosed subject matter). The diffusion layer 68 can diffuse a laser beam Ray1, which is emitted from the semiconductor laser element 14 and can irradiate locally (at a spot) the lower surface 68*a* (equivalent to the first surface in the presently disclosed subject matter), and can transmit the same as diffused light through the upper surface 68*b* (equivalent to the second surface in the presently disclosed subject matter).

For example, the diffusion layer 68 to be employed can be a composite (for example, a sintered body) of YAG (for example, 25%) and alumina $Al_2O_3$ (for example, 75%) into which an activator (also referred to as a luminescent center) such as cerium Ce has not been introduced. The composite may be plate-shaped or layered to have a rectangular outer shape including the lower surface 68*a* and the upper surface 68*b* that are disposed generally in parallel to each other (for example, a rectangle of 0.4 mm×0.8 mm with a thickness of 300 to 400 μm).

For example, the lower surface 68*a* of the diffusion layer 68 (excluding the region exposed to the through hole H1) and the front surface 62 of the base section 18*b* (the bottom surface 62*a*1 of the recessed portion 62*a*) can be adhered and thereby secured to each other by a silicon-based adhesive.

The diffusion layer 68 is not limited to the aforementioned one, but may also be, for example, a composite of YAG and glass or of other materials. The diffusion layer 68 may also have a generally uniform thickness across the entirety thereof or partially different thicknesses. The lower surface 68*a* and the upper surface 68*b* of the diffusion layer 68 may also be a planar surface, a curved surface, or a surface including projections and depressions and/or a curved surface. The outer shape of the lower surface 68*a* and the upper surface 68*b* of the diffusion layer 68 may also have other than a rectangular shape, i.e., a circular, elliptical, or another shape.

In this embodiment, the thickness of the diffusion layer 68 can be 300 to 400 μm from the following viewpoints.

The inventor of this application has confirmed that an increase in the thickness h of the diffusion layer 68 (see FIG. 6) improves variations in the brightness of diffused light emitted from the upper surface 68*b* of the diffusion layer 68, thereby providing a uniform (or generally uniform) distribution of brightness.

Figure 7:
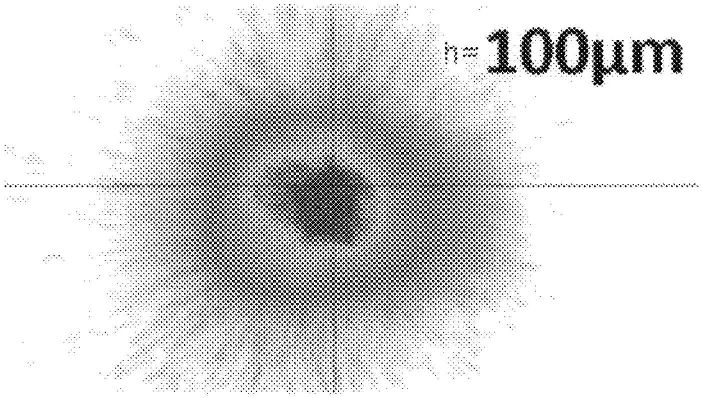
FIGS. 7A to 7C illustrate the brightness distribution of diffused light emitted from an upper surface 68*b* of each of three diffusion layers 68 having a different thickness h when the lower surface 68*a* (a center) of the diffusion layers 68 is irradiated locally (at a spot) with a laser beam condensed by a condenser lens 16.
Figure 7:
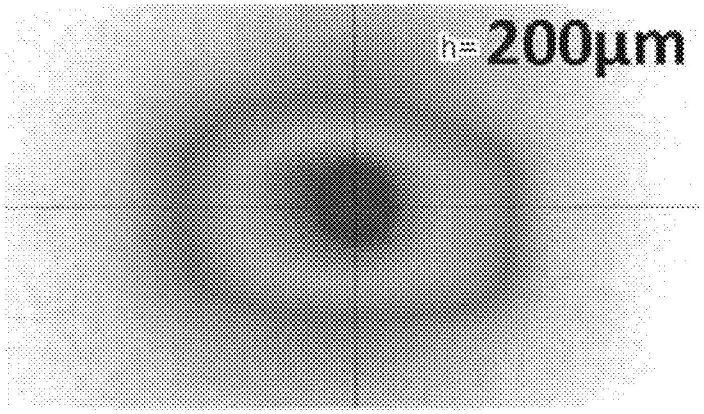
Figure 7:
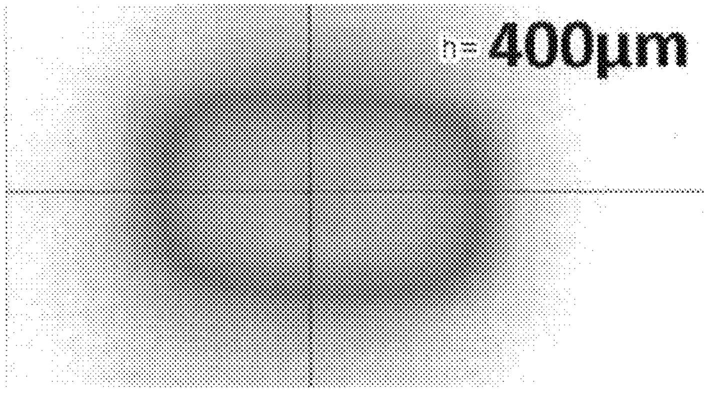

FIGS. 7A to 7C illustrate the brightness distribution of diffused light emitted from the upper surface 68*b* of each of three diffusion layers 68 having a different thickness h when the lower surface 68*a* of the diffusion layers 68 (the center) is irradiated locally (at a spot) with a laser beam condensed by the condenser lens 16. The diffusion layer 68, which employs the composite (a plate-shaped rectangle having a size of 0.4 mm×0.8 mm) of YAG (25%) and alumina $Al_2O_3$ (75%) into which an activator such as cerium Ce has not been introduced, was adjusted so that a laser beam emitted from the semiconductor laser element 14 and condensed by the condenser lens 16 had an elliptical shape of a spot size approximately 100 μm along the major axis and approximately 20 μm to 30 μm along the minor axis. The side of the diffusion layer 68 was covered with the reflective member 66 (white resin).

With reference to FIGS. 7A to 7C, it can be seen that variations in brightness are gradually improved with increases in the thickness h of the diffusion layer 68 from 100 μm (see FIG. 7A) through 200 μm (see FIG. 7B) to 400 μm (see FIG. 7C), so that the brightness distribution is uniform (or generally uniform) at thickness h=400 μm. This is because with increasing thickness h of the diffusion layer 68, a laser beam condensed by the condenser lens 16 (and the light emission by the laser beam) experience an increased number of times of scattering (an increased number of times of scattering due to the difference in refractive index between YAG and alumina $Al_2O_3$) within the diffusion layer 68 so as to become uniform, so that the uniform laser beam (and the light emission by the laser beam) are emitted from the upper surface 68*b* of the diffusion layer 68.

As described above, it can be seen that an increase in the thickness h of the diffusion layer 68 allows the diffused light emitted from the upper surface 68*b* of the diffusion layer 68 to be improved in brightness variation and provide a uniform (or generally uniform) brightness distribution.

On the basis of the aforementioned findings, the thickness h of the diffusion layer 68 is set at a thickness (in this exemplary embodiment, the thickness h=300 μm to 400 μm) at which the diffused light emitted from the upper surface 68*b* of the diffusion layer 68 provides a uniform (or generally uniform) brightness distribution. Note that the thickness h of the diffusion layer 68 is not limited 300 μm to 400 μm, but may also fall within a range other than that so long as the diffusion effects can be obtained.

According to the diffusion layer 68 constructed as above, it is possible to prevent degradation in efficiency caused by brightness saturation or temperature quenching. This is because a laser beam emitted from the semiconductor laser element 14 and condensed by the condenser lens 16 is not incident as a local beam of light upon the wavelength conversion layer 70 (a lower surface 70*a*), but is diffused in the diffusion layer 68 to enter into the wavelength conversion layer 70 (the lower surface 70*a*) as diffused light having a generally uniform brightness distribution.

As illustrated in FIG. 6, the wavelength conversion layer 70 can include: the lower surface 70*a* (equivalent to a third surface in the presently disclosed subject matter) bonded to the upper surface 68*b* of the diffusion layer 68; and an upper surface 70*b* opposite thereto (equivalent to a fourth surface in the presently disclosed subject matter). The wavelength conversion layer 70 can wavelength-convert the diffused light from the diffusion layer 68 which is incident upon the lower surface 70*a*, and emits the resulting light from the upper surface 70*b*.

For example, the wavelength conversion layer 70 to be employed can be a composite (for example, a sintered body) of YAG and alumina $Al_2O_3$ into which an activator such as cerium Ce has been introduced. The composite may be plate-shaped or layered to have a rectangular outer shape including the lower surface 70*a* and the upper surface 70*b* that are disposed generally in parallel to each other (for example, a rectangle of 0.4 mm×0.8 mm with a thickness of 80 μm).

The diffusion layer 68 and the wavelength conversion layer 70 can be secured (bonded) to each other with the upper surface 68*b* of the diffusion layer 68 and the lower surface 70*a* of the wavelength conversion layer 70 in surface contact with each other. For example, when both the diffusion layer 68 and the wavelength conversion layer 70 are made of ceramic, the diffusion layer 68 (the upper surface 68*b*) and the wavelength conversion layer 70 (the lower surface 70*a*) can be hardened at a high temperature with the upper surface 68*b* of the diffusion layer 68 and the lower surface 70*a* of the wavelength conversion layer 70 in surface contact with each other to be thereby secured (bonded) to each other. On the other hand, when the wavelength conversion layer 70 is a glass phosphor layer, the diffusion layer 68 (the upper surface 68*b*) and the wavelength conversion layer 70 (the lower surface 70*a*) can be hardened with the upper surface 68*b* of the diffusion layer 68 and the lower surface 70*a* of the wavelength conversion layer 70 in surface contact with each other to be thereby secured (bonded) to each other.

The wavelength conversion layer 70 is not limited to the aforementioned one, but may also be, for example, a composite of YAG and glass binder into which an activator such as cerium Ce is introduced or of other materials. The wavelength conversion layer 70 may also have a generally uniform thickness across the entirety thereof or partially different thicknesses. The lower surface 70*a* and the upper surface 70*b* of the wavelength conversion layer 70 may also be a planar surface, a curved surface, or a surface including projections and depressions and/or a curved surface. The outer shape of the lower surface 70*a* and the upper surface 70*b* of the wavelength conversion layer 70 may also have other than a rectangular shape, i.e., a circular shape, an elliptical shape, or another shape.

As illustrated in FIG. 6, the reflective member 66 can be disposed in the recessed portion 62*a* in close contact with at least part of the bottom surface 62*a*1 of the recessed portion 62*a* and part of a side 12*a* of the light-transmitting member 12.

For example, the reflective member 66 to be employed can be a white resin that is elastic (and/or adhesive) and reflective, and more specifically, a binder (a white resin) such as a transparent silicone resin containing a light reflective filler such as titanium oxide. The concentration of the light reflective filler is preferably greater than 10 wt % and less than 50 wt %, more preferably 30 to 40 wt %. This allows for expecting a 95 to 99% reflection effect for a desired wavelength (400 to 800 nm).

The white resin (the reflective member 66) can be in close contact, due to the elasticity (and/or adherability) thereof, with at least part of the bottom surface **62*a*1 of the recessed portion 62*a* and part of the side 12*a* of the light-transmitting member 12. As a result, even when deterioration occurs in the adhesive or the like for adhering the light-transmitting member 12 (the lower surface 68*a* of the diffusion layer 68) to the front surface 62 (the bottom surface 62*a*1 of the recessed portion 62*a*), it is possible to prevent the light-transmitting member 12 from dropping off (or becoming chipped). This is because the white resin (the reflective member 66) that is elastic (and/or adhesive) and reflective serves as a securing member which is in close contact with at least part of the bottom surface 62*a*1 of the recessed portion 62*a* and part of the side 12*a* of the light-transmitting member 12 so as to secure the light-transmitting member 12**.

Furthermore, the light extraction efficiency can be improved as well. This is because the white resin (the reflective member 66) that is elastic (and/or adhesive) and reflective can be in close contact with and cover at least part of the side **12*a* of the light-transmitting member 12, so that light emitted from the side 12*a* of the light-transmitting member 12 can be reflected on the white resin (the reflective member 66) and incident back upon the light-transmitting member 12. This leads to an improvement in the light extraction efficiency when compared with the case where the side 12*a* of the light-transmitting member 12 is not covered with the white resin (the reflective member 66). Note that for example, when an improvement in the light extraction efficiency is not required, the reflective member 66** may be eliminated.

As illustrated in FIG. 5, the first holder 18 retaining the light-transmitting member 12 and the reflective member 66 that are constructed as mentioned above is configured such that the lower end portion of the tubular section **18*a* is inserted into the upper end side of the second holder 20. Then, the first holder 18 can be moved in the Z direction with respect to the second holder 20 to a position at which a laser beam emitted from the semiconductor laser element 14 and condensed by the condenser lens 16 is not dislocated in the Z direction so as to irradiate the light-transmitting member 12 retained in the first holder 18 (the lower surface 68*a* of the diffusion layer 68) with high accuracy. Then, at the resulting position, the first holder 18 can be secured to the second holder 20** by means of YAG welding or an adhesive.

The semiconductor laser element 14 can be a semiconductor light-emitting device configured to emit a laser beam which passes through the through hole H1 to irradiate the light-transmitting member 12 (the lower surface **68*a* of the diffusion layer 68**).

For example, the semiconductor laser element 14 to be employed can be, for example, a laser diode which emits light at a wavelength of blue light (about 450 nm). In this embodiment, as illustrated in FIG. 5, the semiconductor laser element 14 can be packaged as a can-type semiconductor laser light source 14A.

The light emission wavelength of the semiconductor laser element 14 is not limited to the blue light (about 450 nm), but, for example, may be in a near-ultraviolet region (about 405 nm) or a wavelength other than that. If the light emission wavelength of the semiconductor laser element 14 is in a near-ultraviolet region (about 405 nm), the wavelength conversion layer 70 to be employed is a phosphor of three colors of blue, green, and red, or a phosphor of two colors of blue and yellow.

As illustrated in FIG. 5, the semiconductor laser light source 14A can be inserted through the lower end opening of a tubular section **22*a* of the third holder 22 into the tubular section 22*a* and secured to the third holder 22 with a flange section 14A1 of the semiconductor laser light source 14A in contact with the bottom portion of the tubular section 22*a***.

The condenser lens 16 can be an optical assembly configured to condense light emitted from the semiconductor laser element 14 to irradiate the light-transmitting member 12 (the lower surface **68*a* of the diffusion layer 68) locally (at a spot), and retained in the third holder 22 so as to be disposed between the light-transmitting member 12 and the semiconductor laser element 14**.

The third holder 22 retaining the semiconductor laser element 14 and the condenser lens 16 can be moved in the X and Y directions with respect to the second holder 20 to a position at which a laser beam emitted from the semiconductor laser element 14 and condensed by the condenser lens 16 is not dislocated in the X and Y directions so as to highly accurately irradiate the light-transmitting member 12 retained in the first holder 18 with the upper surface of the base section **22*c* in contact with the lower end of the second holder 20. Then, at the resulting position, the third holder 22 can be secured to the second holder 20** by YAG welding or an adhesive.

The light-emitting device 10 is not limited to the one constructed as mentioned above, but, for example, may also be constructed such that the condenser lens 16 is eliminated and the semiconductor laser element 14 and the light-transmitting member 12 are disposed in close proximity to each other and packaged. Or alternatively, the light-emitting device 10 may also be constructed such that the semiconductor laser element 14 and the light-transmitting member 12 are located some distance from each other with a light guide (for example, an optical fiber) disposed therebetween to guide light from the semiconductor laser element 14 to irradiate the light-transmitting member 12.

The projection lens 26 can be an aspherical lens which can be made of a transparent resin such as acrylic, and as illustrated in FIG. 4, can include a front surface **26*a* (convex surface), a rear surface 26*b* (for example, planar or convex surface), and a rear focus F toward the rear surface 26*b***.

For example, the projection lens 26 can be secured in a lens holder 72 and a retaining ring 40 retained in the retainer member 36 with the rear focus F positioned at a second focus F2 of the main reflection surface **28*a*** (or in the vicinity thereof), and disposed on the optical axis AX.

The main reflection surface **28*a* (equivalent to the first reflection surface in the presently disclosed subject matter) can be configured to reflect light from the light-emitting device 10, and transmit and project forward the reflected light through the projection lens 26 so as to form a basic light distribution pattern (for example, at least part of the low-beam light distribution pattern) on a virtual vertical screen confronting the front of the vehicle (located about 25 m ahead of the front of the vehicle). More specifically, the main reflection surface 28*a* can have an elliptical shape of which sectional shape including the optical axis AX includes a first focus F1 and the second focus F2, and an ellipsoid of revolution based reflection surface (an ellipsoid of revolution or a free curved surface of a similar kind) of which eccentricity is set to gradually increase from the vertical section to a horizontal section. The circumferential lower end of the reflector 28 can be secured to the retainer member 36**.

The main reflection surface **28*a* can be covered in the shape of a dome over a range from the side of the light-emitting device 10 to above the same (however, excluding the region toward the vehicle front through which a light beam reflected on the main reflection surface 28***a* passes) so that the light from the light-emitting device 10 emitted upwardly (in the direction to the semisphere) can be incident upon the main reflection surface 28*a*. At a region of the main reflection surface 28*a* which is irradiated with a laser beam from the light-emitting device 10 with the light-transmitting member 12 having dropped off (or having become chipped), there can be formed a through hole H2 through which the laser beam passes.

Figure 8:
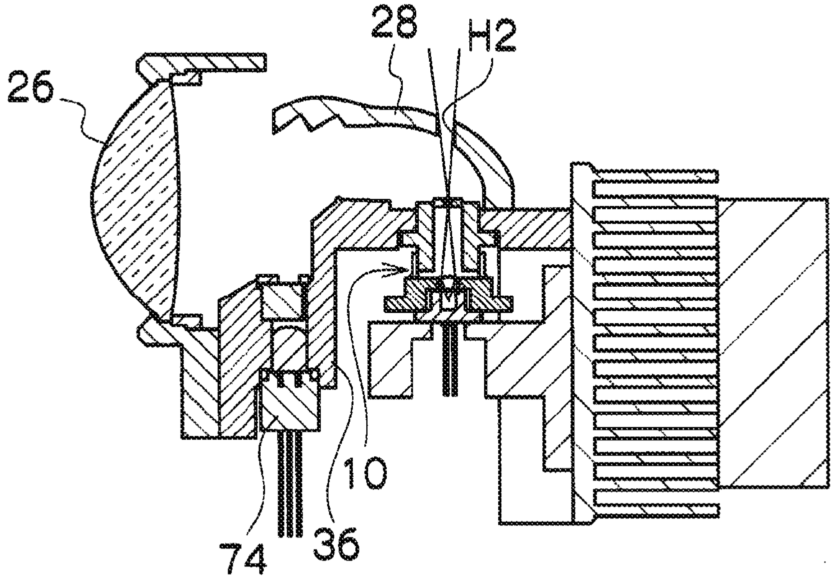
FIG. 8A is a view illustrating a laser beam which is emitted from the light-emitting device 10 and passes through a through hole H2 when a light-transmitting member 12 has dropped off (or has become chipped) in the light-emitting device 10.
FIG. 8B is a view illustrating a laser beam which passes through the through hole H2 and is shielded by a light shielding member 82.
Figure 8:
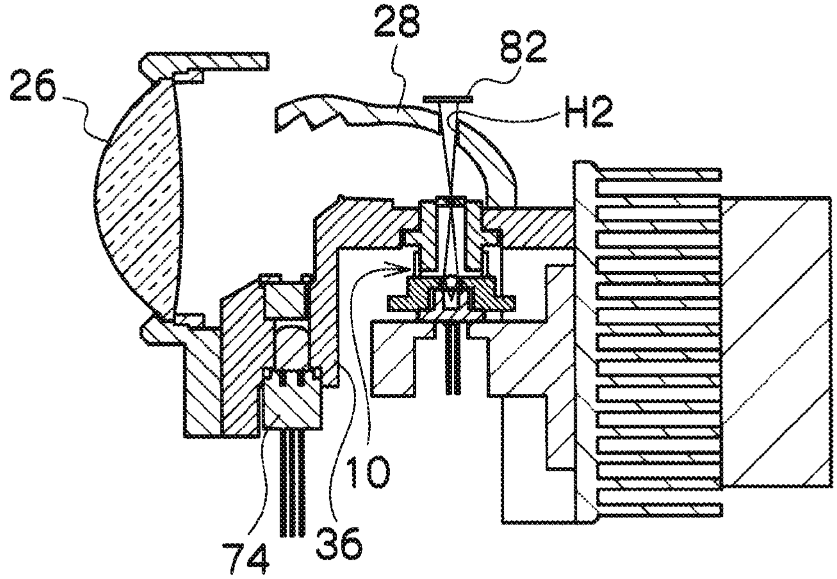

As illustrated in FIG. 8(*a*), in this arrangement, when the light-transmitting member 12 has dropped off (or has become chipped), the laser beam emitted from the light-emitting device 10 with the light-transmitting member 12 having dropped off (or having become chipped) can be allowed to pass through the through hole H2 formed in the main reflection surface 28*a*. It is thus possible to prevent the laser beam emitted from the light-emitting device 10 with the light-transmitting member 12 having dropped off (or having become chipped) from being reflected on the main reflection surface 28*a* and transmitted through the projection lens 26 and projected forward.

Note that as illustrated in FIG. 8(*b*), it may also be acceptable to dispose a light shielding member 82, such as a black metal plate configured to shield a laser beam passing through the through hole H2, outside the reflector 28 so as to confront the through hole H2.

Note that the size of the through hole H2 can be determined depending on, for example, the angle of divergence of a laser beam emitted from the light-emitting device 10 with the light-transmitting member 12 having dropped off (or having become chipped), the focus and NA of the projection lens 26, the distance from the light-transmitting member 12 to the reflector 28, and the mounting tolerance of the reflector 28 and the retainer member 36.

The first sub-reflection surface 28*b* can reflect a light beam emitted forward and diagonally upwardly from the light-emitting device 10 (a light beam that cannot be used as the basic light distribution pattern) toward a third sub-reflection surface 34 disposed below the first sub-reflection surface 28*b*. As illustrated in FIG. 4, the first sub-reflection surface 28*b* can be disposed at a position which is ahead of the front end of the main reflection surface 28*a* and at which the beam of light reflected on the main reflection surface 28*a* is not blocked. The third sub-reflection surface 34 is configured to allow the reflected beam of light from the first sub-reflection surface 28*b* to be reflected thereon, to be transmitted through the projection lens 26 and projected forward and diagonally upwardly, and to form an overhead light distribution pattern on the imaginary vertical screen. The third sub-reflection surface 34 can be retained in the retainer member 36 below the first sub-reflection surface 28*b*.

The light detection unit 74 can detect a light beam wavelength-converted by the light-transmitting member 12 (for example, a yellow-based beam of light when the wavelength conversion layer 70 is the composite of YAG and alumina $Al_2O_3$ into which an activator such as cerium Ce is introduced). The light detection unit 74 to be employed can be, for example, a photodiode.

As illustrated in FIG. 4, the light detection unit 74 can be retained in the retainer member 36, and interposed between the projection lens 26 and the light-emitting device 10 and disposed below the optical axis AX at a position at which the reflected beam of light from the main reflection surface 28*a* is not blocked. Note that the photodiode (the light detection unit 74) can be provided with a diode socket 86 as illustrated in FIG. 3.

The second sub-reflection surface 28*c* (equivalent to the second reflection surface in the presently disclosed subject matter) can reflect a light beam emitted forward and diagonally upwardly from the light-emitting device 10 (a light beam that cannot be used as the basic light distribution pattern) toward the light detection unit 74 disposed below the second sub-reflection surface 28*c*. The second sub-reflection surface 28*c* can be disposed at a position which is ahead of the front end of the main reflection surface 28*a* (and the first sub-reflection surface 28*b*) and at which the reflected beam of light from the main reflection surface 28*a* is not blocked.

The main reflection surface 28*a*, the first sub-reflection surface 28*b*, and the second sub-reflection surface 28*c* may be integrally constructed by performing mirror finishing such as aluminum vapor deposition on a reflector base material molded in one piece, or alternatively may also be constructed as physically separated individual components.

A light shielding member 76 including a pin hole H3 through which a light beam reflected on the second sub-reflection surface 28*c* passes and an optical filter 78 can be disposed between the second sub-reflection surface 28*c* and the light detection unit 74. For example, the optical filter 78 to be employed can be a bandpass filter configured to transmit only a light beam wavelength-converted by the light-transmitting member 12 (for example, a yellow-based beam of light) among those beams of light reflected on the second sub-reflection surface 28*c* and having passed through the pin hole H3 and not to transmit the other beams of light. This makes it possible to prevent beams of light (for example, ambient light such as sunlight or light from an oncoming vehicle) other than the light wavelength-converted by the light-transmitting member 12 (for example, yellow-based light) from entering the light detection unit 74, thereby providing an improved S/N ratio to the photodiode (the light detection unit 74). Furthermore, when only the wavelength conversion layer 70 has dropped off and only the diffusion layer 68 is left in the light-transmitting member 12 that includes the diffusion layer 68 and the wavelength conversion layer 70, a laser beam diffused in the diffusion layer 68 is incident upon the photodiode (the light detection unit 74). As means for preventing this, the wavelength select filter 78 can be employed to cut the wavelength of the laser beam and detect the presence or absence of light through the phosphor (the wavelength conversion layer 70), thereby determining an abnormal event so as to control the laser element 14. Note that depending on the wavelength characteristics or the like of the photodiode, the optical filter 78 may be eliminated.

The second sub-reflection surface 28*c* to be employed can be, for example, an ellipsoid of revolution for which a first focus $F1_{28c}$ is set at the light-transmitting member 12 of the light-emitting device 10 (or at the vicinity thereof) and a second focus $F2_{28c}$ is set within the pin hole H3 (or at the vicinity thereof).

Figure 9:
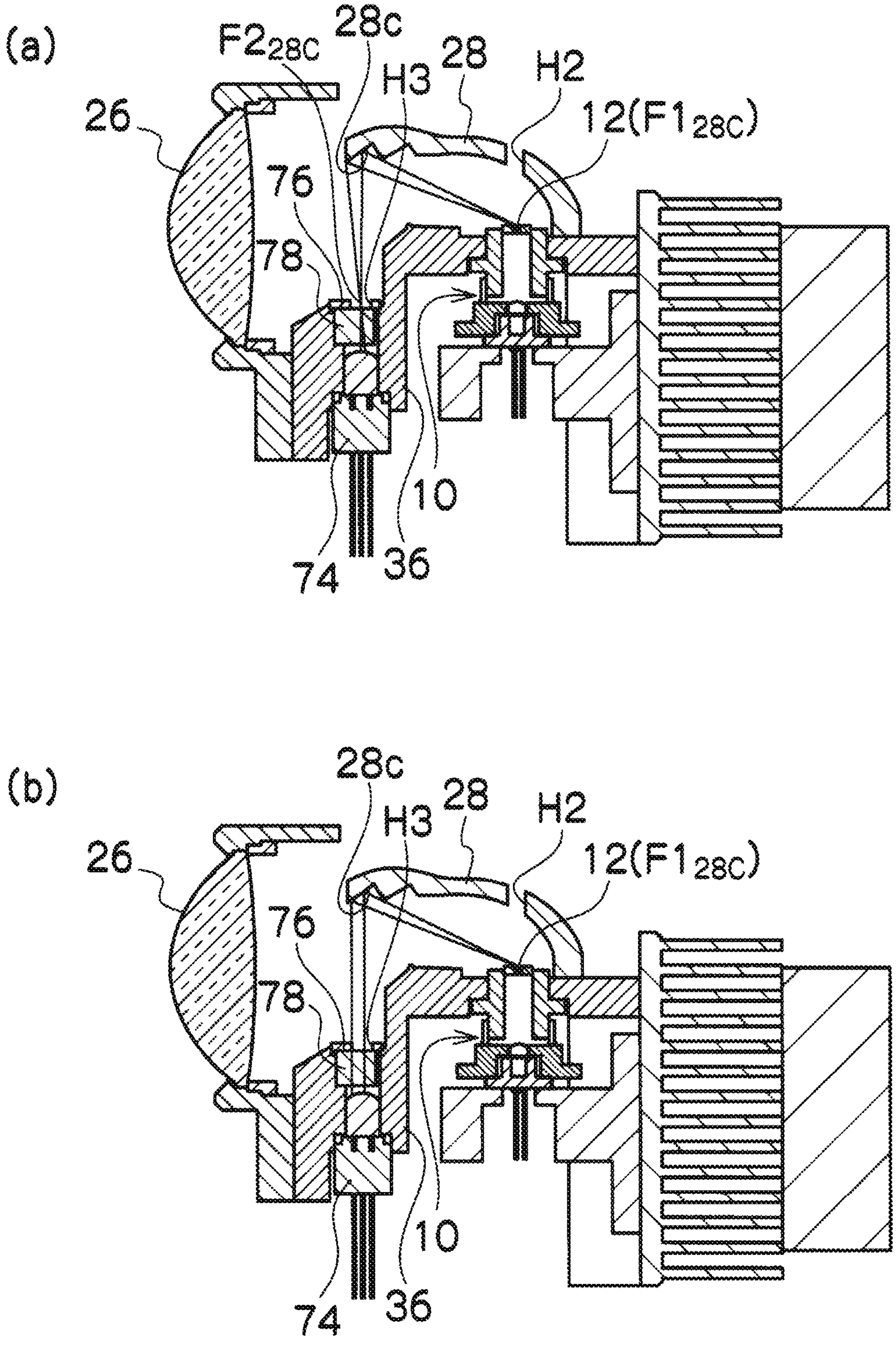
FIG. 9A is a view illustrating a light beam from the light-emitting device 10 reflected on a second sub-reflection surface 28*c* (an ellipsoid of revolution) and incident upon light detection unit 74 after being condensed at a second focus $F2_{28c}$ and having passed through a pin hole H3.
FIG. 9B is a view illustrating a light beam from the light-emitting device 10 reflected on a second sub-reflection surface 28*c* (a paraboloid of revolution) and incident upon the light detection unit 74 as a parallel beam after having passed through the pin hole H3.

As illustrated in FIG. 9(*a*), this makes it possible to reduce the diameter of the pin hole H3 because the light emitted from the light-emitting device 10 and reflected on the second sub-reflection surface 28*c* is condensed at the second focus $F2_{28c}$. As a result, it is possible to provide an improved S/N ratio to the photodiode (the light detection unit 74) because light (for example, ambient light such as sunlight or light from oncoming vehicles) other than those beams of light emitted from the light-emitting device 10 and reflected on the second sub-reflection surface 28*c* can be prevented from passing through the pin hole H3 and entering the light detection unit 74.

Note that the second sub-reflection surface 28*c* to be employed can be other than the aforementioned ellipsoid of revolution, for example, as illustrated in FIG. 9(*b*), a paraboloid of revolution for which a focus $F1_{28c}$ is set at the light-transmitting member 12 of the light-emitting device 10 (or at the vicinity thereof). When the paraboloid of revolution is employed as the second sub-reflection surface 28*c*, the diameter of the pin hole H3 is increased, but the pin hole H3 is not required of position accuracy such as position tolerance when compared with the case where an ellipsoid of revolution is employed as the second sub-reflection surface 28*c*.

Furthermore, the second sub-reflection surface 28*c* to be employed can be, for example, an ellipsoid of revolution for which the first focus $F1_{28c}$ is set at the light-transmitting member 12 of the light-emitting device 10 (or at the vicinity thereof) and the second focus $F2_{28c}$ is set at the photodiode (the light detection unit 74) or at the vicinity thereof.

This makes it possible to reduce the size of the light-receiving surface of the photodiode (the light detection unit 74).

The photodiode (the light detection unit 74) to be employed may also be designed to have a narrow light-receiving angle. This allows for reducing the influence of ambient light.

For example, the control unit 80 can serve as means for controlling the semiconductor laser element 14 so as not to emit laser beams on the basis of a detection result provided by the light detection unit 74 in a control circuit such as the ECU to which the semiconductor laser element 14 and the light detection unit 74 are electrically connected. For example, the control unit 80 can provide control to the semiconductor laser element 14 so as not to emit laser beams while the semiconductor laser element 14 is emitting laser beams and when the light detection unit 74 does not detect light (for example, yellow-based light) that has been wavelength-converted by the light-transmitting member 12.

The retainer member 36 can include a mirror surface 30 extending from the rear focus F of the projection lens 26 toward the light-emitting device 10. The front edge 30*a* of the mirror surface 30 can be formed not in a straight line but in a curved shape depending on the spherical aberration of the projection lens 26 from the viewpoints of retarding the influence caused by the spherical aberration of the projection lens 26 and making the cut-off line clear.

A light beam emitted from the light-emitting device 10 and incident upon the mirror surface 30 can be reflected upwardly and refracted by the projection lens 26 to be projected below the cut-off line. That is, the beam of light emitted from the light-emitting device 10 and reflected upwardly can be returned from the front edge 30*a* (serving as a light shielding member configured to form the cut-off line) of the mirror surface 30.

Now, a description will be made to a positioning mechanism 42 for positioning the light-emitting device 10 with respect to and mounting the same to the retainer member 36.

As illustrated in FIGS. 2 to 4, the positioning mechanism 42 can include, for example, a support member 44 and a pair of vertical guide members 46*a* and 46*b*.

The support member 44, which can movably support the light-emitting device 10 across a horizontal plane, can include a base section 48 and a main support body 50. The base section 48 and the main support body 50 can be made of a metal such as aluminum integrally in one piece so as to act as heat transfer means (heat radiating path) through which the heat generated by the light-emitting device 10 can pass. The support member 44 can form a center step height part that can be fitted into a space S between the pair of vertical guide members 46*a* and 46*b*.

The base section 48, which can be a rectangular plate-shaped member, can include a front surface 52 facing in the forward direction of the vehicle, and a rear surface 54 that is opposite thereto and faces in the backward direction of the vehicle.

The front surface 52 of the base section 48 can include the main support body 50 that is protruded forward above the front surface at a general vertical center thereof.

A base section 58*a* (a front surface 58*b*) of a heat sink 58 can be securely screwed to the rear surface 54 of the base section 48.

The front surface 58*b* of the base section 58*a* of the heat sink 58 can include side surfaces 58*b*1 and 58*b*2 that are disposed on both the right and left sides of the support member 44. The side surfaces 58*b*1 and 58*b*2 can be brought into surface contact with the vertical guide members 46*a* and 46*b* (vertical guide surfaces 46*a*1 and 46*b*1) that extend in the vertical direction, and disposed on both the sides of the support member 44.

The heat generated by the light-emitting device 10 can pass through the support member 44 and the heat sink 58 so as to be dissipated from a heat dissipation fin 58*c* of the heat sink 58 into the ambient air. A fan 88 for blowing cooling air to the heat radiating fin 58*c* can be disposed behind the heat sink 58. The fan 88 may be secured to the heat sink 58 or secured to a member other than the heat sink 58.

The main support body 50 can movably support the light-emitting device 10 across a horizontal plane and can be protruded forward above the front surface 52 of the base section 48 at the general vertical center thereof.

The upper surface 50*a* of the main support body 50 can be kept on a horizontal plane when the support member 44 is fitted into the space S between the pair of vertical guide members 46*a* and 46*b* and when the side surfaces 58*b*1 and 58*b*2 on both the right and left sides are in surface contact with the pair of vertical guide members 46*a* and 46*b* (the vertical guide surfaces 46*a*1 and 46*b*1).

As illustrated in FIG. 4, the light-emitting device 10 can be placed on the upper surface 50*a* of the main support body 50 while the lower end of the semiconductor laser light source 14A (or the lower end of the third holder 22) is in surface contact with the upper surface 50*a* of the main support body 50.

The light-emitting device 10 can be inserted into through holes 22*e* formed in a flange section 22*b* of the third holder 22, and then mounted onto the main support body 50 by means of screws N1 that are screwed into screw holes 50*b* formed in the main support body 50 (for example, at four positions).

The through holes 22*e* formed in the flange section 22*b* of the third holder 22 can have a larger diameter than that of the screws N1 inserted therein. Thus, loosening the screws N1 screwed in the screw holes 50*b* formed in the main support body 50 would allow the light-emitting device 10 to be movable within the range of the through holes 22*e* across the upper surface 50*a* (a horizontal plane) of the main support body 50.

The pair of vertical guide members 46*a* and 46*b* can support the support member 44, and can be made of a metal such as aluminum so as to extend in the vertical direction and integrated with the retainer member 36 made of a metal such as aluminum. The pair of vertical guide members 46*a* and 46*b* can be disposed on both the right and left sides of the optical axis AX in such a manner as to be symmetric with respect to the optical axis AX. The space S into which the support member 44 can be fitted can be formed between the pair of vertical guide members 46*a* and 46*b*.

The pair of vertical guide members 46*a* and 46*b* can include the vertical guide surfaces 46*a*1 and 46*b*1 that extend in the vertical direction. The vertical guide surfaces 46*a*1 and

**46*b*1, which are oriented in the backward direction of the vehicle, can be a vertical surface (a vertical surface orthogonal to the optical axis AX) with which the side surfaces 58*b*1 and 58*b*2 on both the right and left sides are in surface contact, and which slidingly moves in the vertical direction while the side surfaces 58*b*1 and 58*b*2** on both the right and left sides are in surface contact therewith.

Now, a description will be made to an example operation of positioning the light-emitting device 10 relative to the retainer member 36 and mounting thereto.

First, the support member 44 can be fitted into the space S between the pair of vertical guide members **46*a* and 46*b*, and the side surfaces 58*b*1 and 58*b*2 on both the right and left sides can be brought into surface contact with the vertical guide surfaces 46*a*1 and 46*b*1 of the pair of vertical guide members 46*a* and 46*b*. This allows the upper surface 50*a* of the main support body 50 to be oriented horizontally and the light-emitting device 10** to be disposed under a predetermined light source position P.

Next, the screws N1 screwed in the screw holes **50*b* formed in the main support body 50 are loosened; the light-emitting device 10 is moved across the upper surface 50*a* of the main support body 50 (a horizontal plane); and the light-transmitting member 12 can be positioned on a vertical axis $AX_P$ that passes through the predetermined light source position P (positioning within a horizontal plane). Then, at that position, the screws N1 screwed in the screw holes 50*b* formed in the main support body 50 are tightened (equivalent to the first securing means in the presently disclosed subject matter) to thereby secure the light-emitting device 10 to the main support body 50**.

This eliminates variations in the positional relation between the light-transmitting member 12 and the semiconductor laser element 14 (variations in the X and Y directions, i.e., variations within a horizontal plane), the variations being caused, for example, by the semiconductor laser element 14 and the condenser lens 16 being varyingly mounted to the third holder 22.

Next, the support member 44 can be slidingly moved in the vertical direction (upward) along the vertical guide surfaces **46*a*1 and 46*b*1 while the support member 44 is fitted in the space S between the pair of vertical guide members 46*a* and 46*b* and the side surfaces 58*b*1 and 58*b*2 on both the right and left sides are in surface contact with the vertical guide surfaces 46*a*1 and 46*b*1 of the pair of vertical guide members 46*a* and 46*b***.

Soon after the support member 44 is slidingly moved in the vertical direction along the vertical guide surfaces **46*a*1 and 46*b*1, the upper tubular section 18*a* of the first holder 18 of the light-emitting device 10 secured to the support member 44 can be fitted into a through hole 36*a* formed in the retainer member 36. Soon after the support member 44 is further slidingly moved in the vertical direction along the vertical guide surfaces 46*a*1 and 46*b*1, the flange section 18*c* of the first holder 18 of the light-emitting device 10 can be brought into contact with a lower surface 36*b* of the retainer member 36 (equivalent to the stopper in the presently disclosed subject matter) so as to restrict the vertical sliding movement of the support member 44 (see FIG. 4). This allows the light-transmitting member 12** to be positioned at the predetermined light source position P (positioning in the vertical direction).

Then, at that position, those screws (not shown) inserted in through holes **58*d* formed in the base section 58*a* of the heat sink 58 can be screwed into the pair of vertical guide members 46*a* and 46*b*, thereby securing the support member 44 and the vertical guide member 46** (equivalent to the second securing means in the presently disclosed subject matter).

In this manner, variations in the positional relation between the light-transmitting member 12 and the semiconductor laser element 14 (variations in the Z direction, i.e., variations in the vertical direction) can be eliminated, the variations being caused, for example, by the semiconductor laser element 14 or the condenser lens 16 being varyingly mounted to the third holder 22.

In this manner, while the light-transmitting member 12 can be located at the first focus F1 of the main reflection surface **28*a* (or at the vicinity thereof), the light-emitting device 10 can be retained by the retainer member 36 and disposed behind the rear focus F of the projection lens 26**.

Now, a description will be made to an example operation of the lighting unit 100 configured as mentioned above (an example of control provided to the semiconductor laser element 14).

Figure 10:
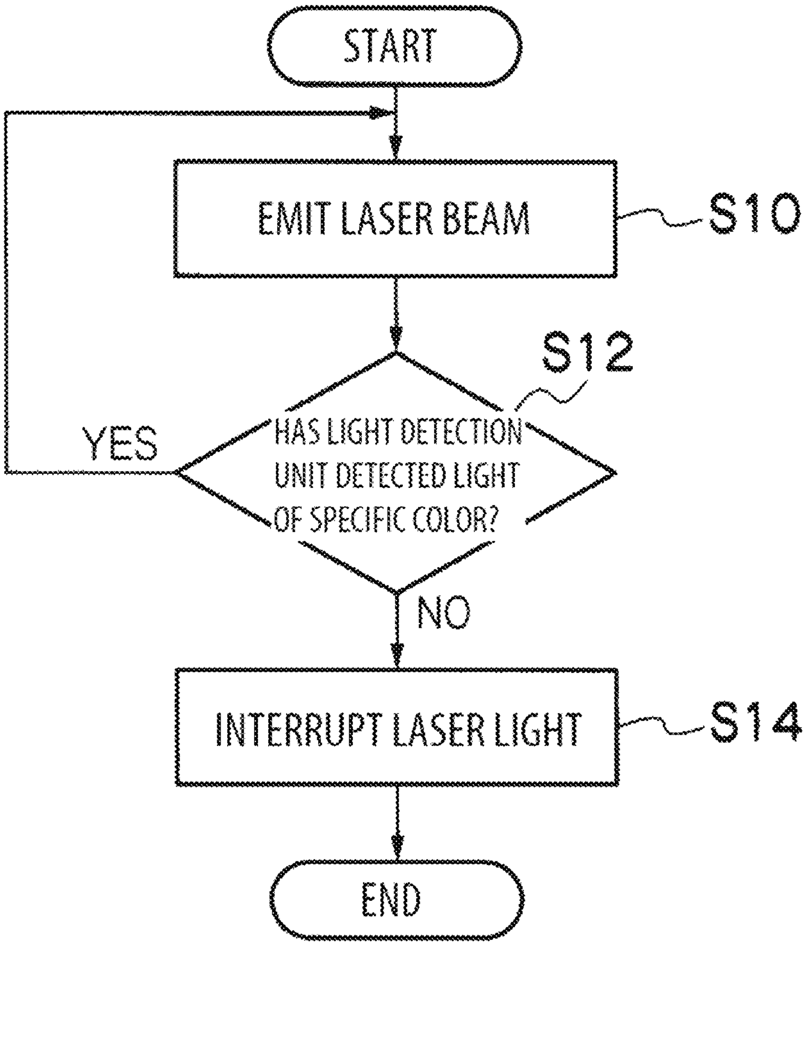
FIG. 10 is an explanatory flowchart showing an example operation of the lighting unit 100 (an example of control provided to a semiconductor laser element 14)

FIG. 10 is an explanatory flowchart of an example operation of the lighting unit 100 (an example of control provided to the semiconductor laser element 14).

The following processing can be performed mainly by the control circuit (the control unit 80), such as the ECU, to which the semiconductor laser element 14 and the light detection unit 74 can be electrically connected.

First, a description will be made to an example operation of the lighting unit 100 (an example of control provided to the semiconductor laser element 14) when the light-transmitting member 12 has not dropped off (or has not become chipped).

As illustrated in FIG. 6, when the semiconductor laser element 14 is emitting a laser beam (for example, a blue-based laser beam) (step S10), the laser beam Ray1 from the semiconductor laser element 14 can be condensed by the condenser lens 16 to pass through the through hole H1 and then locally irradiate the light-transmitting member 12 (the lower surface **68*a* of the diffusion layer 68) disposed at a location some distance from the semiconductor laser element 14. The spot size can be adjusted, for example, to an elliptical shape of a major length of about 100 μm and a minor length of about 20 to 30 μm. The light Ray1 for locally irradiating the light-transmitting member 12 (the lower surface 68*a* of the diffusion layer 68) can be diffused inside the diffusion layer 68 and emitted from the upper surface 68*b* of the diffusion layer 68 as diffused light having a uniform (or generally uniform) brightness distribution so as to be incident upon the lower surface 70*a* of the wavelength conversion layer 70**.

The wavelength conversion layer 70 upon which the diffused light from the diffusion layer 68 is incident can emit white light which is a mixture of the diffused light passing therethrough from the diffusion layer 68 and light that is emitted by being excited by the diffused light from the diffusion layer 68 (light that is wavelength-converted by the light-transmitting member 12 (for example, yellow-based light)).

The white light from the light-emitting device 10 reflected on the main reflection surface **28*a* can pass through the projection lens 26 and can be projected forward so as to form, on the virtual vertical screen, the basic light distribution pattern (for example, at least part of the low-beam light distribution pattern defined by the front edge 30*a* of the mirror surface 30). Furthermore, the white light from the light-emitting device 10 reflected on the first sub-reflection surface 28*b* and the third sub-reflection surface 34 can pass through the projection lens 26** and projected forward and diagonally upwardly so as to form an overhead light distribution pattern on the virtual vertical screen.

Then, the white light from the light-emitting device 10 reflected on the second sub-reflection surface **28*c* can pass through the pin hole H3 and can be incident upon the light detection unit 74 with beams of light, other than one that has been wavelength-converted by the light-transmitting member 12 (for example, a yellow-based beam of light), being cut by the optical filter 78**.

If the light detection unit 74 detects a light beam of a specific color, that is, the light that has been wavelength-converted by the light-transmitting member 12 (for example, yellow-based light) (Yes in step S12), the control unit 80 determines that the light-transmitting member 12 is normal (has not dropped off (or has not become chipped)) and then provides control so that the semiconductor laser element 14 continues to emit laser beams.

Now, a description will be made to an example operation of the lighting unit 100 (an example of control provided to the semiconductor laser element 14) when the light-transmitting member 12 has dropped off (or has become chipped) while the semiconductor laser element 14 is emitting a laser beam as described above.

When the light-transmitting member 12 has dropped off (or has become chipped), the light of a specific color, that is, the light that has been wavelength-converted by the light-transmitting member 12 (for example, yellow-based light) is not incident upon the light detection unit 74. If the light detection unit 74 does not detect the light of a specific color, that is, the light that has been wavelength-converted by the light-transmitting member 12 (for example, yellow-based light) (No in step S12), the control unit 80 determines that the light-transmitting member 12 has dropped off (or has become chipped) (or the light detection unit 74 has failed) and then provides control so that the semiconductor laser element 14 does not emit laser beams (step S14).

When the light-transmitting member 12 has dropped off (or has become chipped), the aforementioned arrangement allows for preventing the laser beam emitted from the light-emitting device 10 with the light-transmitting member 12 having dropped off (or having become chipped) from being reflected on the main reflection surface 28*a* and transmitted through the projection lens 26 so as to be projected forward.

Furthermore, when the light-transmitting member 12 has dropped off (or has become chipped), the laser beam emitted from the light-emitting device 10 with the light-transmitting member 12 having dropped off (or having become chipped) can pass through the through hole H2 formed in the main reflection surface 28*a* as illustrated in FIG. 8(*a*). Thus, even if it takes time until the semiconductor laser element 14 is controlled so as not to emit a laser beam (step S14), it is possible to prevent the laser beam emitted from the light-emitting device 10 with the light-transmitting member 12 having dropped off (or having become chipped) from being reflected on the main reflection surface 28*a* and transmitted through the projection lens 26 so as to be projected forward.

Note that when the time required to control the semiconductor laser element 14 so as not to emit laser beams (step S14) can be made to be such a short time as will not exceed a required safety level, the through hole H2 of the main reflection surface 28*a* may be eliminated.

As described above, the lighting unit 100 according to this embodiment can provide the following advantages.

Figure 1:
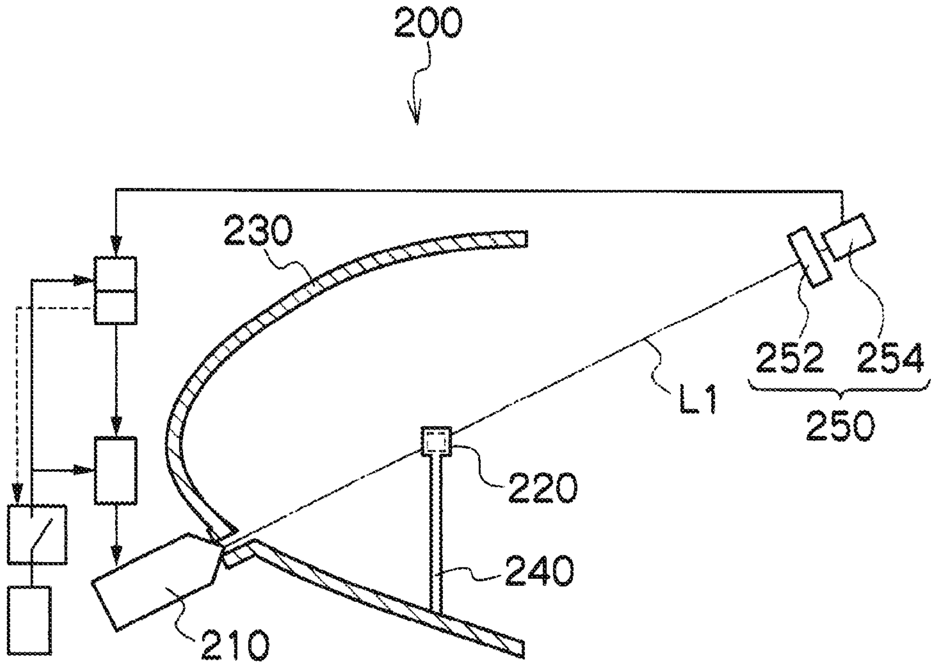
FIG. 1 is a longitudinal sectional view illustrating a vehicle headlight 200 disclosed in Patent Literature 1.

First, the lighting unit employing the semiconductor laser element 14 as a light source can be reduced in size as compared with the conventional vehicle headlight 200 (see FIG. 1). This is because the light detection unit 74 can be disposed between the projection lens 26 and the light-emitting device 10, and the second reflection surface 28*c* for reflecting the light from the light-emitting device 10 toward the light detection unit 74 can be disposed ahead of the front end of the first reflection surface 28*a*.

Secondly, it is possible to enhance the light utilization efficiency of the light-emitting device 10. This is because the light emitted from the light-emitting device 10 forward and diagonally upwardly (the light that cannot be used as the basic light distribution pattern) can be allowed to be reflected on the second sub-reflection surface 28*c* so as to be incident upon the photodiode (the light detection unit 74).

Thirdly, when the light-transmitting member 12 has dropped off (or has become chipped), it is possible to prevent the laser beam emitted from the light-emitting device 10 with the light-transmitting member 12 having dropped off (or having become chipped) from being reflected on the main reflection surface 28*a* and transmitted through the projection lens 26 so as to be projected forward. This is because the control unit 80 can provide control to the semiconductor laser element 14 so as not to emit laser beams while the semiconductor laser element 14 is emitting laser beams and when the light detection unit 74 does not detect the light that has been wavelength-converted by the light-transmitting member 12 (i.e., when the light-transmitting member 12 has dropped off (or has become chipped) or the light detection unit 74 has failed).

Fourthly, it is possible to improve the S/N ratio of the photodiode (the light detection unit 74). This is because the light shielding member 76 that includes the pin hole H3 through which a reflected beam of light from the second sub-reflection surface 28*c* passes can be disposed between the second sub-reflection surface 28*c* and the light detection unit 74, thereby allowing for preventing beams of light other than the light emitted by the light-emitting device 10 and reflected on the second sub-reflection surface 28*c* (for example, sunlight or ambient light such as light from oncoming vehicles) from passing through the pin hole H3 and being incident upon the light detection unit 74.

Fifthly, it is possible to "further" improve the S/N ratio of the photodiode (the light detection unit 74). This is because the second sub-reflection surface 28*c* employed herein can be an ellipsoid of revolution in which the first focus $F1_{28c}$ is set at the light-transmitting member 12 of the light-emitting device 10 (or at the vicinity thereof) and the second focus $F2_{28c}$ is set within the pin hole H3 (or at the vicinity thereof). Since this allows the light from the light-emitting device 10 reflected on the second sub-reflection surface 28*c* to be focused on the second focus $F2_{28c}$, the diameter of the pin hole H3 can be reduced. As a result, it is possible to "further" prevent beams of light other than the light emitted by the light-emitting device 10 and reflected on the second sub-reflection surface 28*c* (for example, sunlight or ambient light such as light from oncoming vehicles) from passing through the pin hole H3 and being incident upon the light detection unit 74.

Sixthly, even if it takes time until the semiconductor laser element 14 is controlled so as not to emit laser beams (step S14), it is possible to prevent the laser beam emitted from the light-emitting device 10 with the light-transmitting member 12 having dropped off (or having become chipped) from being reflected on the main reflection surface 28*a* and transmitted through the projection lens 26 so as to be projected forward. This is because when the light-transmitting member 12 has dropped off (or has become chipped), the laser beam emitted from the light-emitting device 10 with the light-transmitting member 12 having dropped off (or having become chipped) passes through the through hole H2 formed in the main reflection surface 28*a* as illustrated in FIG. 8(*a*).

Now, a description will be made to a modified example.

The aforementioned embodiment is illustrated in relation to an example in which the presently disclosed subject matter is applied to a projector type lighting unit that is adapted to form a low-beam light distribution pattern. However, the presently disclosed subject matter is not limited thereto. The presently disclosed subject matter can also be applied to a projector type lighting unit that is configured to form a high-beam light distribution pattern (for example, the first sub-reflection surface 28*b*, the third sub-reflection surface 34, and the mirror surface 30 are eliminated, and the main reflection surface 28*a* is adjusted to suit the high beam).

Figure 11:
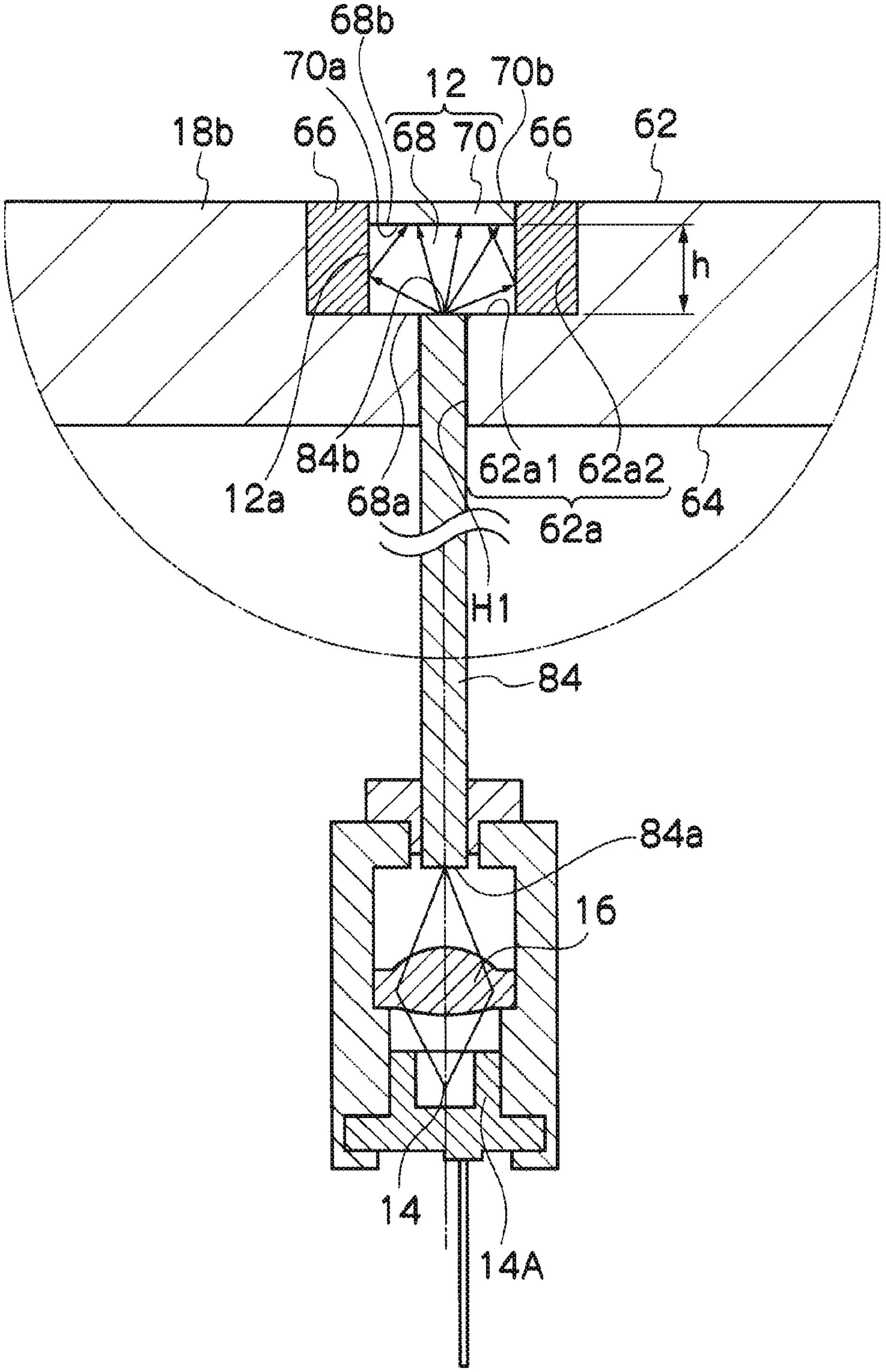
FIG. 11 is a cross-sectional view illustrating a light-emitting device 10 (a modified example).

FIG. 11 is a cross-sectional view illustrating a light-emitting device 10 (a modified example).

As an optical system for condensing the laser beam from the semiconductor laser element 14 and irradiating locally (at a spot) the light-transmitting member 12 (the lower surface 68*a* of the diffusion layer 68), it is also possible to employ such an optical system that includes, in place of the condenser lens 16, a condenser lens 16 which condenses a laser beam from the semiconductor laser element 14, and a light guide fiber 84 which guides the laser beam emitted from the semiconductor laser element 14 and condensed by the condenser lens 16 so as to irradiate locally (at a spot) the light-transmitting member 12 (the lower surface 68*a* of the diffusion layer 68) as illustrated in FIG. 11. The light guide fiber 84 can be an optical fiber which includes, for example, the core at the center (for example, 0.2 mm in core diameter) and a clad surrounding the core (both not illustrated). The core has a higher refractive index than that of the clad. Thus, a laser beam emitted from the semiconductor laser element 14 and condensed by the condenser lens 16 can be introduced through one end surface 84*a* of the light guide fiber 84 into the light guide fiber 84. Then, the laser beam can be guided to the other end surface 84*b* of the light guide fiber 84 while being confined within the core due to total reflection on the boundary between the core and the clad, and emitted through the other end surface 84*b* so as to irradiate locally (at a spot) the light-transmitting member 12 (the lower surface 68*a* of the diffusion layer 68) disposed at a location some distance from the semiconductor laser element 14.

The light irradiating locally the light-transmitting member 12 (the lower surface 68*a* of the diffusion layer 68) can be diffused inside the diffusion layer 68 and emitted as diffused light having a uniform (or generally uniform) brightness distribution through the upper surface 68*b* of the diffusion layer 68 so as to be incident upon the lower surface 70*a* of the wavelength conversion layer 70.

The wavelength conversion layer 70 upon which the diffused light from the diffusion layer 68 is incident can emit white light which is a mixture of the diffused light passing therethrough from the diffusion layer 68 and light that is emitted by being excited by the diffused light from the diffusion layer 68 (the light that has been wavelength-converted by the light-transmitting member 12 (for example, yellow-based light)).

The light-emitting device 10 according to this modified example can also provide the same effects as those provided by the aforementioned embodiment.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight comprising:

a projection lens disposed on an optical axis extending in a front-to-rear direction of a vehicle body;

a light-emitting device including a semiconductor laser element configured to emit a laser beam and a light-transmitting member configured to absorb and convert the wavelength of at least part of the laser beam from the semiconductor laser element;

a first reflection surface configured to reflect the light from the light-emitting device so as to transmit and project forward the resulting light through the projection lens;

a light detection unit configured to detect a light beam of a specific color, the light detection unit being disposed between the projection lens and the light-emitting device and below the optical axis;

a second reflection surface configured to reflect the light beam from the light-emitting device toward the light detection unit, the second reflection surface being disposed ahead of the front end of the first reflection surface; and a control unit configured to control the semiconductor laser element in accordance with a detection result provided by the light detection unit so that the semiconductor laser element does not emit the laser beam.

2. The vehicle headlight according to claim 1, wherein the light of a specific color is a light beam that is wavelength-converted by the light-transmitting member, and the control unit controls the semiconductor laser element so as not to emit a laser beam while the semiconductor laser element is emitting the laser beam and when the light detection unit does not detect light that has been wavelength-converted by the light-transmitting member.

3. The vehicle headlight according to claim 2, comprising a light shielding member disposed between the projection lens and the light-emitting device, the light shielding member being configured to block a light beam travelling upward among those beams from the light-emitting device to be projected forward through the projection lens.

4. The vehicle headlight according to claim 3, comprising a second light shielding member disposed between the second reflection surface and the light detection unit, and a pin hole through which a reflected light beam from the second reflection surface passes can be formed in the second light shielding member.

5. The vehicle headlight according to claim 4, wherein the second reflection surface is an ellipsoid of revolution having a first focus at or substantially near the light-transmitting member, and a second focus set inside the pin hole or at the vicinity thereof.

6. The vehicle headlight according to claim 2, comprising a light shielding member disposed between the second reflection surface and the light detection unit, and a pin hole through which a reflected light beam from the second reflection surface passes can be formed in the light shielding member.

7. The vehicle headlight according to claim 6, wherein the second reflection surface is an ellipsoid of revolution having a first focus at or substantially near the light-transmitting member, and a second focus set inside the pin hole or at the vicinity thereof.

8. The vehicle headlight according to claim 2, wherein an area of the first reflection surface to be irradiated with a laser beam from the light-emitting device with the light-transmitting member having dropped off has a through hole formed to allow the laser beam to pass therethrough.

9. The vehicle headlight according to claim 2, comprising an optical system configured to condense the laser beam from the semiconductor laser element so as to locally irradiate the light-transmitting member.

10. The vehicle headlight according to claim 1, comprising a light shielding member disposed between the projection lens and the light-emitting device, the light shielding member being configured to block a light beam travelling upward among those beams from the light-emitting device to be projected forward through the projection lens.

11. The vehicle headlight according to claim 10, comprising a second light shielding member disposed between the second reflection surface and the light detection unit, and a pin hole through which a reflected light beam from the second reflection surface passes can be formed in the second light shielding member.

12. The vehicle headlight according to claim 11, wherein the second reflection surface is an ellipsoid of revolution having a first focus at or substantially near the light-transmitting member, and a second focus set inside the pin hole or at the vicinity thereof.

13. The vehicle headlight according to claim 10, wherein an area of the first reflection surface to be irradiated with a laser beam from the light-emitting device with the light-transmitting member having dropped off has a through hole formed to allow the laser beam to pass therethrough.

14. The vehicle headlight according to claim 10, comprising an optical system configured to condense the laser beam from the semiconductor laser element so as to locally irradiate the light-transmitting member.

15. The vehicle headlight according to claim 1, comprising a light shielding member disposed between the second reflection surface and the light detection unit, and a pin hole through which a reflected light beam from the second reflection surface passes can be formed in the light shielding member.

16. The vehicle headlight according to claim 15, wherein the second reflection surface is an ellipsoid of revolution having a first focus at or substantially near the light-transmitting member, and a second focus set inside the pin hole or at the vicinity thereof.

17. The vehicle headlight according to claim 16, wherein an area of the first reflection surface to be irradiated with a laser beam from the light-emitting device with the light-transmitting member having dropped off has a through hole formed to allow the laser beam to pass therethrough.

18. The vehicle headlight according to claim 15, wherein an area of the first reflection surface to be irradiated with a laser beam from the light-emitting device with the light-transmitting member having dropped off has a through hole formed to allow the laser beam to pass therethrough.

19. The vehicle headlight according to claim 15, comprising an optical system configured to condense the laser beam from the semiconductor laser element so as to locally irradiate the light-transmitting member.

20. The vehicle headlight according to claim 16, comprising an optical system configured to condense the laser beam from the semiconductor laser element so as to locally irradiate the light-transmitting member.

21. The vehicle headlight according to claim 1, wherein an area of the first reflection surface to be irradiated with a laser beam from the light-emitting device with the light-transmitting member having dropped off has a through hole formed to allow the laser beam to pass therethrough.

22. The vehicle headlight according to claim 21, comprising an optical system configured to condense the laser beam from the semiconductor laser element so as to locally irradiate the light-transmitting member.

23. The vehicle headlight according to claim 1, comprising an optical system configured to condense the laser beam from the semiconductor laser element so as to locally irradiate the light-transmitting member.

24. The vehicle headlight according to claim 23, wherein the light-transmitting member include:

a diffusion layer having a first surface to be locally irradiated with a laser beam from the semiconductor laser element and a second surface opposite thereto, the diffusion layer configured to diffuse a laser beam irradiating locally the first surface so as to emit the beam as diffused light through the second surface; and a wavelength conversion layer having a third surface bonded to the second surface and a fourth surface opposite thereto, the wavelength conversion layer configured to convert the wavelength of at least part of the diffused laser beam incident upon the third surface from the diffusion layer so as to emit the resulting beam through the fourth surface.

25. The vehicle headlight according to claim 24, wherein the diffusion layer has a thickness at which the diffused light emitted through the second surface has a generally uniform brightness distribution.

* * * * *